United States Patent [19]
Fierthaler

[11] Patent Number: 5,145,245
[45] Date of Patent: Sep. 8, 1992

[54] CABINET FOR STORAGE OF VIDEO CASSETTES

[76] Inventor: Frederick Fierthaler, Perch Pond Rd., R.D. #1, Box 133, Mineveh, N.Y. 13813

[21] Appl. No.: 401,334

[22] Filed: Aug. 31, 1989

[51] Int. Cl.⁵ .............................................. A47B 88/00
[52] U.S. Cl. .................................................. 312/321.5
[58] Field of Search .............. 312/321.5, 324; 211/75; 248/225.1, 220.2, 214

[56] References Cited
U.S. PATENT DOCUMENTS 3,089,745  5/1963  Postula et al. ....................... 312/324
4,368,934  1/1983  Somers ................................. 312/13
4,467,925  8/1984  Ratzloff et al. ................. 248/214 X

FOREIGN PATENT DOCUMENTS 332963  6/1903  France .

Primary Examiner—Joseph Falk
Attorney, Agent, or Firm—Salzman & Levy

[57] ABSTRACT

A video cassette storage cabinet has both rotating and slidable storage units to provide access to interior storage pockets in the internal cabinet shelving. The doors of the cabinet can be only partially opened to provide access to the interior.

16 Claims, 4 Drawing Sheets

CABINET FOR STORAGE OF VIDEO CASSETTES

FIELD OF THE INVENTION

This invention relates to storage cabinets, and more particularly to a compact storage cabinet for video cassettes having rotating and sliding storage units for providing unique access to otherwise inaccessibly recessed storage pockets.

BACKGROUND OF THE INVENTION

In recent times, there has been a tremendous surge in the use and storage of home video tapes.

People are now stacking video cassettes in their home libraries, the same way that books or records have been stacked in the past.

The size of the video cartridge requires shelving with a shallow interior dimension, whether the cassettes are arranged on their side edge, in order to read the title label, or on their bottom edge, which is the recommended position for proper storage.

Obviously, most shelving in the home is designed for books, and usually has an interior dimension of greater depth than is necessary for the stacking of the video tapes. This has led to wasted space, and a generally unsatisfactory use of home shelving.

Many individuals, therefore, have preferred to store their tapes in plastic cassette holders which have currently come into the marketplace. However, as video libraries expand, these holders do not provide enough storage capacity, and they themselves become a storage problem.

Also, many apartment dwellers do not have the luxury of expanded wall space for extensive video shelving.

It is, therefore, realized by this invention, that a special cabinet was needed to store video cassettes.

One of the objects of this invention was to design a cabinet that would store a large quantity of tapes in a small space, but one that made possible an ease of access to all the stored cassettes. This not only meant that the tapes should be properly stacked as recommended by the manufacturers, but that they should also be stacked in such a way that all their labels are readable.

Another object of the invention was to design a cabinet with little or no wasted internal space so that video tape density is maximized.

Still another object of this invention was to provide a cabinet with an internal stacking formula that would allow access to interior stacks, when the doors of the cabinet were only partially open, i.e., when the doors were swung open from a closed position to a 90 degree (open) position.

This object was deemed necessary to accommodate the apartment dweller with limited wall space.

In this manner such a cabinet could be utilized in cramped quarters, or in apartment areas generally too small for other efficient uses.

Finally, one of the important objects of the invention was to provide a cabinet that looked like a fine piece of furniture.

DESCRIPTION OF RELATED ART

In the French patent no. 332,963, issued on Jun. 11, 1903, a cabinet for books is shown, wherein there are internal swing-out sections and some books are mounted upon the door, in order to maximize book stacking density.

In U.S. Pat. No. 4,368,934; issued on Jan. 18, 1983, a cabinet for cassettes is shown wherein modular cassette holders can be attached to each other to provide an expanded storage device. Individual units are rotatable within the device to provide swing-out access to the video tapes.

SUMMARY OF THE INVENTION

The present invention features a storage cabinet that stores and properly displays video cassettes in a compact, high density manner.

The cabinet features a plurality of storage units or modules. A first set of interior storage units comprises several pair of containers that are rotatively movable about a central, cabinet support member.

A second set of storage units comprises several pair of storage boxes that are slidably mounted on the inside of the cabinet doors for easy removal.

The cabinet doors are swingable through an arc of approximately 180 degrees (full open) from a closed position.

The first set of interior storage units are made accessible by only a partial opening of the doors, i.e., when the doors are opened approximately half way (90 degrees of rotative arc).

The cabinet also features deeply recessed interior shelves, which are easily accessed when the first set of storage modules are swung out, i.e., rotated about the central support.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Generally speaking, the invention relates to a video cassette cabinet having both rotating and slidable modular storage units to provide high density, and easily accessible cassette storage.

For the purposes of brevity, like elements and components shall bear the same designation throughout the figures.

Figure 1:
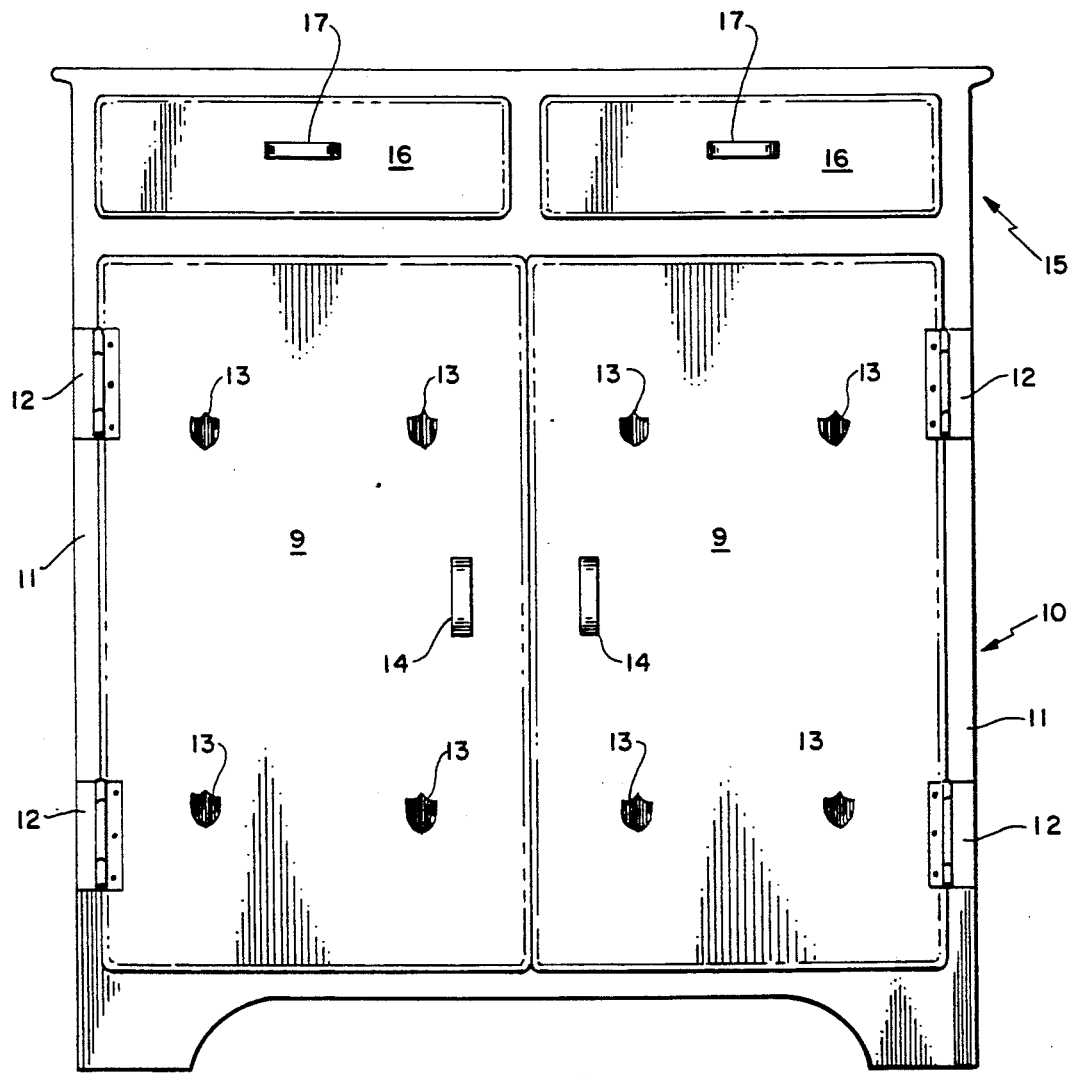
FIG. 1 is a front view of the video cassette cabinet of the invention.
Figure 2:
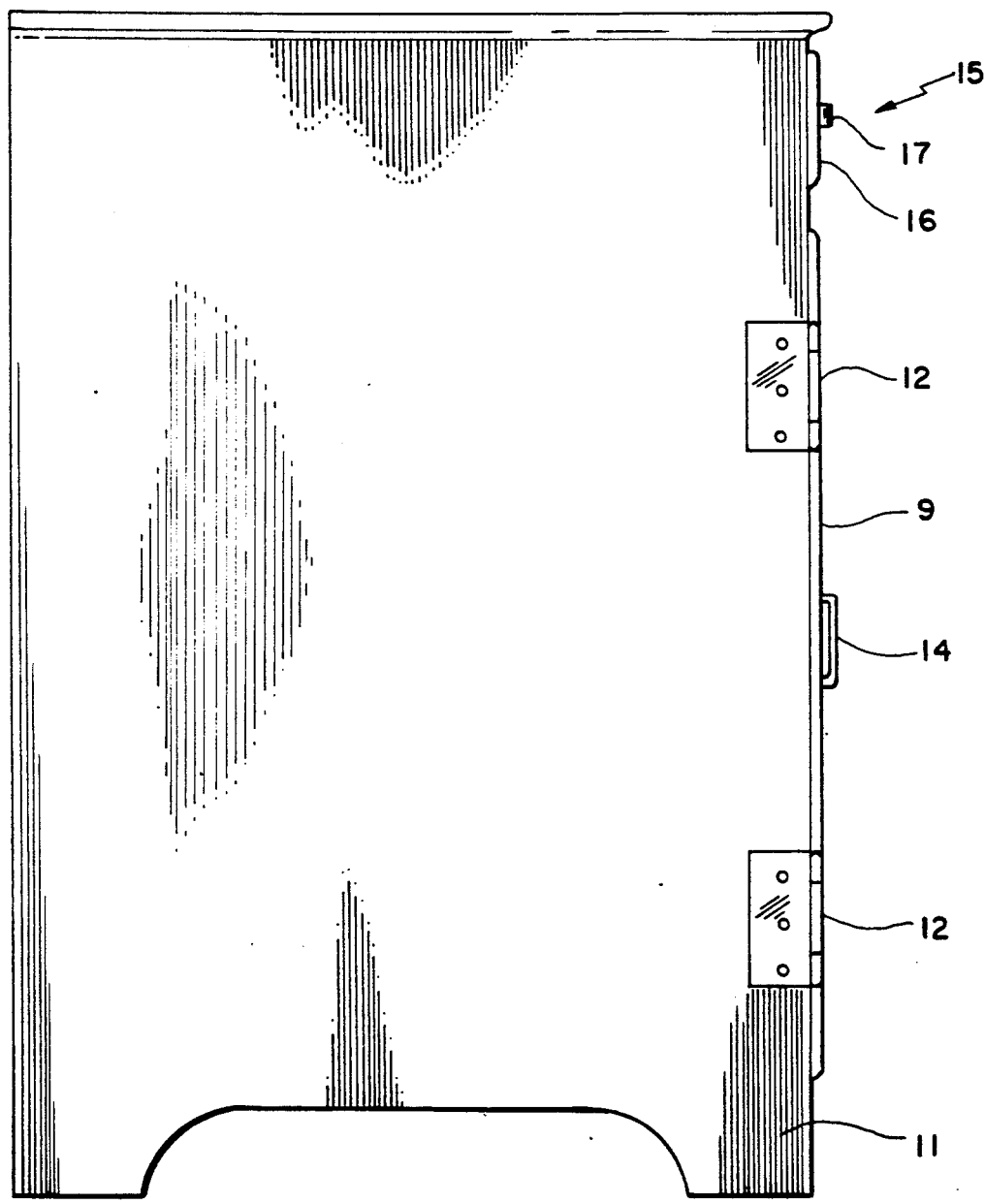
FIG. 2 is a side view of the cabinet shown in FIG. 1.

Now referring to FIGS. 1 and 2, the video storage cabinet 10 of this invention is shown. The cabinet 10 is generally rectilinear and made from fine woods, such as mahogany, walnut, rosewood, etc.

The cabinet 10 has two front doors 9 that are hinged to the cabinet housing 11, by brass saddle hinges 12. The front of the doors 9 can comprise brass ornamental crests 13, as shown, and two brass handles 14 for pulling the doors 9 from the closed position (FIGS. 1 and 2) to an open position, shown in FIGS. 3 and 4 and described in greater detail hereinbelow.

A top portion 15 of the cabinet 10 comprises two slide-out drawers 16, as illustrated. Handles 17 provide the means to grasp the drawers 16.

Figure 3:
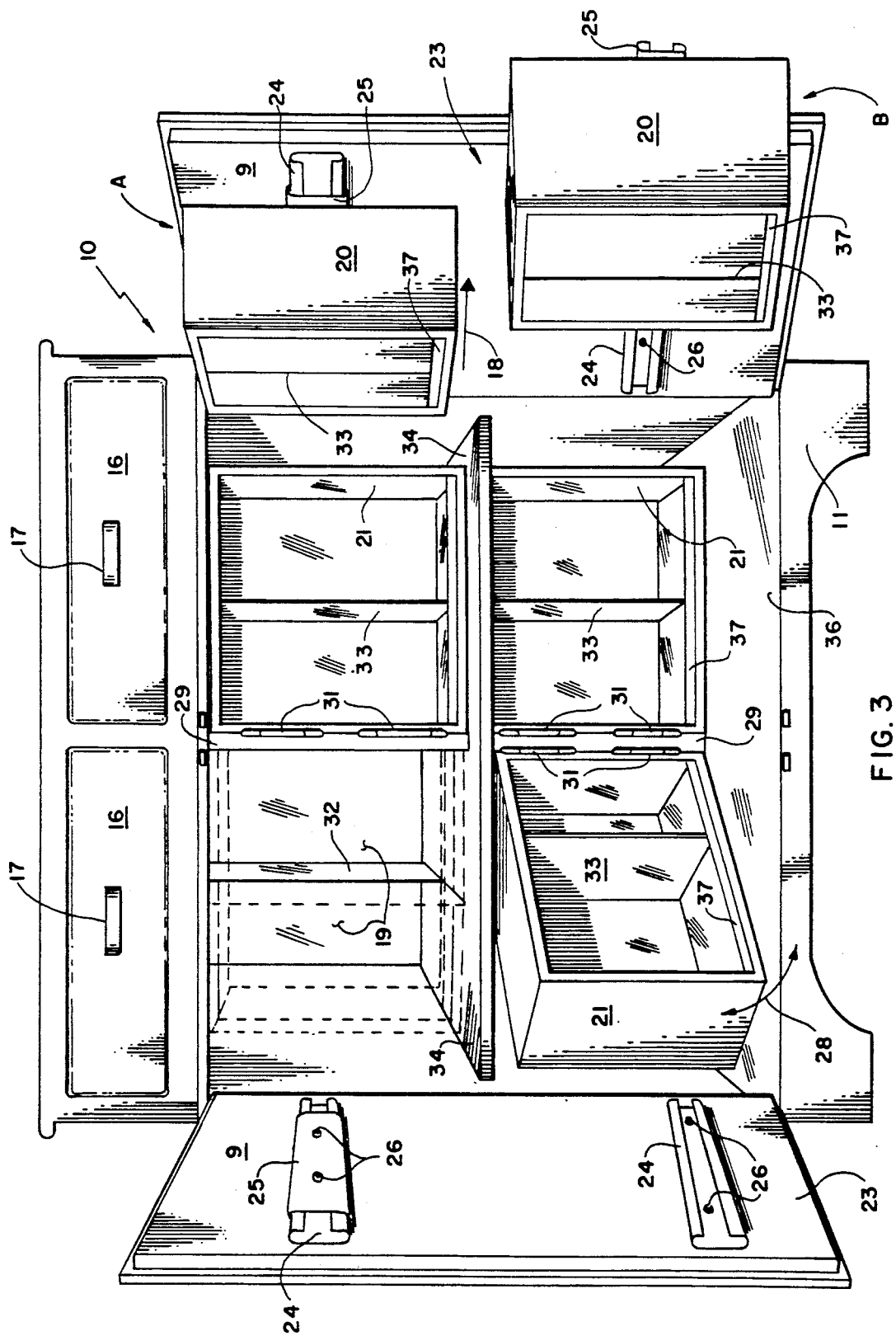
FIG. 3 is a front internal, perspective view of the cabinet of FIG. 1, with modular units illustrated in various positions of assembly and access.
Figure 4:
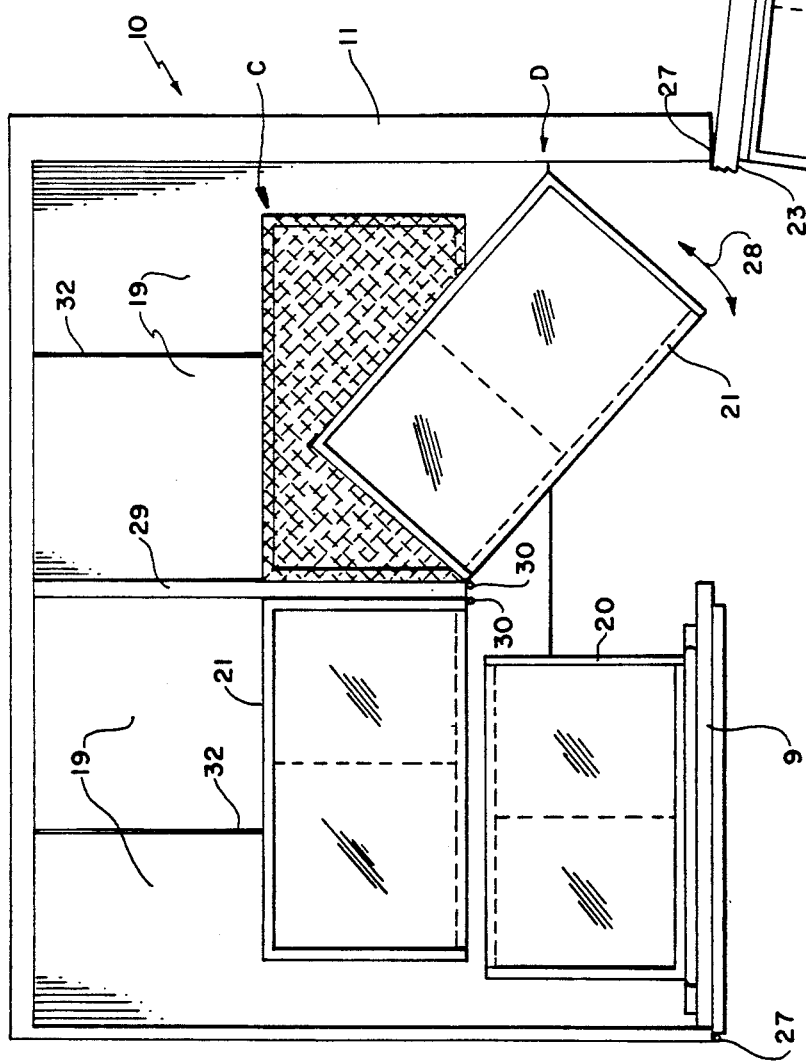
FIG. 4 is a sectional, internal, top view of the cabinet shown in FIG. 3.

Referring to FIGS. 3 and 4, the internal structure of cabinet 10 is depicted in detail with various views of access of modular storage units 20 and 21 illustrated for purposes of description and clarification.

The cabinet 10 is shown with doors 9 in an open position, with the exception of the left door of FIG. 4, which is closed.

The cabinet 10 has slidable storage units 20, which slidably mount on the interior surface 23 of doors 9 by means of curvilinear tracks 24 (FIG. 3).

The storage units 20 have curvilinear jaws 25 mounted on their rear surface which slidably mate with the curvilinear tracks 24 mounted on the doors 9.

The jaws 25 and tracks 24 mount to their respective surfaces by means of conventional screw fasteners 26, as illustrated in FIG. 3.

FIG. 3 depicts the storage units 20 in various positions in order to better describe by way of illustration the operation of storage units 20 with respect to doors 9.

In FIGS. 3 and 4, the right door 9 of cabinet 10 depicts upper and lower storage units 20 in respective initial and extended stages A and B. The jaw 25 (FIG. 3) of upper right unit 20 is engaged with track 24 at position A and then slid (arrow 18) upon track 24 till it reaches extended position B.

When both doors 9 are initially opened, all the units 20 are in the initial mounted position A.

Units 20 lay adjacent to units 21 when the door 9 is closed, as shown by the closed left door in FIG. 4.

The jaws 25 and tracks 24 are made curvilinear to provide a smooth sliding action of unit 20 upon the door 9, without a loose or rocking fit. The jaws 25 and tracks 24 can be made of wood or metal and may incorporate suitable bearings as are well known in the art.

Storage units 20 and 21 are wooden containers or receptacles of precise dimensions to accommodate a given number of cassettes without difficulty. The cassettes (not shown) are slid upon their edge into the storage units 20 and 21 and completely fill the available space with provided clearance for their removal. Storage units 20 and 21 have respective recessed lips 37 (FIG. 3) that run the length of each unit 20 and 21 for preventing displacing of the cassettes, not shown, from their stored positions when the units 20 and 21 are moved.

The doors 9 can be rotated on their hinges 12 (FIG. 1) about hinge point 27 (FIG. 4) to provide approximately 180 degrees of arc movement from the closed position shown for the left door to the almost completely open position depicted by the right door.

The interior storage units 21 are completely accessible, however, by only approximately 90 degrees of rotation of doors 9, in order to provide functionality even in tight or cramped spaces.

The storage units 21 are rotatively hinged for movement (arrows 28) as shown in FIG. 4. The hinges 31 (FIG. 3) for units 21 are mounted to a center support 29 of cabinet 10. Hinges 31 and hinges 12 (FIG. 1) are bolted through center support 29, cabinet housing 11 and doors 9 by means of male and female screws, not shown, and may incorporate appropriate washers and plates for additional support.

The left upper storage unit 21 of FIG. 3 has been purposely left out of the figure to reveal internal shelving pockets 19 disposed behind the storage units 21. A better view of the shelving pockets 19 is shown in FIG. 4.

Storage units 21 are rotatively swung from position C to a position D (FIG. 4) in order to access the shelving pockets 19.

The shelving pockets 19 are delineated by partitions 32, and center support 29.

Storage units 20 and 21 are also shown with partitions 33, but it is to be understood that the partitioning can be designed for each cassette, or in any convenient design to accommodate other storage articles.

The cabinet 10 also features a lateral partition 34 (FIG. 3) dividing the cabinet into upper and lower levels.

Partitioning, except for center support 29 is arbitrary with the user, and partitions can be made for insertion and removal by the cabinet designer.

Figure 5:
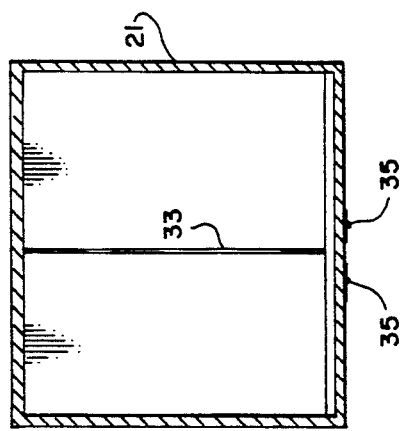
FIG. 5 a front view of a typical storage module featuring a ball bearing race in a bottom portion thereof.

Referring to FIG. 5, a storage unit 21 is shown having several ball bearing races 35 on the bottom portion of the container 21. These ball bearing races 35 can be useful in facilitating the rotation of the units 21 about hinge point 30 (FIG. 4).

The ball bearings 35 can also be placed on floor 36 (FIG. 3) and on the upper surface of the partition 34 to provide a similar result.

Moreover, ball bearing races 35 are also used in conjunction with storage units 20 and 21 to provide support therefor in their closed positions.

Having thus described the invention, what is desired to be protected by Letters Patent is presented by the subsequently appended claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A storage cabinet having movable containers for ease of access to stored articles, comprising:
   a rectilinear housing having shelving within a hollow portion thereof defining a plurality of adjacent storage pockets;
   a pair of oppositely articulated doors swingably attached to front distal corner sections of said rectilinear housing, each of said doors having an inside surface supporting at least one fixed curvilinear track for slidably supporting a storage container;
   at least one storage box removably disposed on each door and fixed to a curvilinear jaw for slidably engaging with said fixed curvilinear track;
   means defining a center support; and
   a set of oppositely articulated storage containers swingably attached to said center support and movably disposed thereabout.

2. The storage cabinet of claim 1, wherein each door has two tracks for supporting a pair of storage boxes.

3. The storage cabinet of claim 1, wherein said set of storage containers comprises two pairs of storage containers, each pair oppositely swingable about said center support.

4. The storage cabinet of claim 1, wherein said shelving is disposed behind said set of storage containers, and further wherein said set of storage containers swivel about said center support in order to access the storage pockets in said shelving.

5. The storage cabinet of claim 1, further comprising a race of ball bearings disposed under each storage container in order to facilitate the movement and support of each storage container with respect to said housing.

6. The storage cabinet of claim 1 wherein each storage container comprises a partition in a mid-portion thereof.

7. The storage cabinet of claim 1, further comprising a pair of drawers slidably disposed within said rectilinear housing.

8. The storage cabinet of claim 1, for particular use in storing video cassettes.

9. The storage cabinet of claim 1, wherein said doors can be swingably rotated through an approximate arc of 180 degrees from a closed position to an open position.

10. The storage cabinet of claim 9, wherein said set of storage containers can be accessed by rotating said doors from said closed position through at least approximately 90 degrees of arc.

11. A storage cabinet for storing and displaying video cassettes comprising a plurality of storage units, a first set of said storage units being rotatively movable about a mid-section support and a second set of said storage units being slidable with respect to said cabinet and supported upon an inner surface of a pair of doors which are swingable through an arc of approximately 180 degrees from a closed position to an open position, and wherein said first set of storage units is made accessible when said doors are rotated from said closed position to at least approximately 90 degrees of arc.

12. The storage cabinet of claim 11, further comprising shelving having storage pockets disposed behind said first set of storage units, said storage pockets being accessible when said first set of storage units is rotatively moved from a closed position.

13. The storage cabinet of claim 11, wherein said first set of storage units comprises two pairs of oppositely articulated storage containers.

14. The storage cabinet of claim 11, wherein said second set of storage units comprises two pairs of storage receptacles.

15. The storage cabinet of claim 11, further comprising a pair of drawers slidably disposed above said first and second set of storage units.

16. The storage cabinet of claim 11 wherein each of said plurality of storage units has a recessed lip mounted on a lower portion thereof for preventing dislodgement of said video cassettes.

* * * * *